United States Patent
Wajs

(10) Patent No.: US 7,296,162 B2
(45) Date of Patent: Nov. 13, 2007

(54) TIME VALIDATION SYSTEM

(75) Inventor: Andrew Augustine Wajs, Haarlem (NL)

(73) Assignee: Irdeto Access B.V., Hoofddorp (NL)

( * ) Notice: Subject to any disclaimer, the term of this patent is extended or adjusted under 35 U.S.C. 154(b) by 719 days.

(21) Appl. No.: 10/206,245

(22) Filed: Jul. 26, 2002

(65) Prior Publication Data

US 2003/0023853 A1    Jan. 30, 2003

(30) Foreign Application Priority Data

Jul. 26, 2001   (EP)   ................... 01202864

(51) Int. Cl.
*H04L 9/00* (2006.01)
(52) U.S. Cl. ............. 713/178; 380/30; 380/200; 380/217
(58) Field of Classification Search .......... 713/178
See application file for complete search history.

(56) References Cited

U.S. PATENT DOCUMENTS

| | | | |
|---|---|---|---|
| 5,444,780 A * | 8/1995 | Hartman, Jr. ............. | 380/30 |
| 5,500,897 A | 3/1996 | Hartman, Jr. | |
| 5,504,816 A * | 4/1996 | Hamilton et al. ......... | 380/217 |
| 5,572,514 A * | 11/1996 | Miyake ..................... | 370/248 |
| 6,154,206 A * | 11/2000 | Ludtke ...................... | 713/168 |
| 6,222,924 B1 * | 4/2001 | Salomaki .................. | 380/200 |

FOREIGN PATENT DOCUMENTS

| | | |
|---|---|---|
| EP | 0666694 A1 | 8/1995 |
| EP | 0898425 A2 | 2/1999 |
| WO | WO9728649 | 8/1997 |
| WO | WO9728649 A1 * | 8/1997 |

OTHER PUBLICATIONS

European Search Report Mar. 19, 2002—2 pages.

* cited by examiner

*Primary Examiner*—Gilberto Barron, Jr.
*Assistant Examiner*—Samson Lemma
(74) *Attorney, Agent, or Firm*—Schwegman, Lundberg & Woessner, P.A.

(57) ABSTRACT

A system for time validation comprises a terminal (1) with means (7,7') for tuning in to a number of different carrier frequencies (a-e), an authorisation device (6), e.g. a smart card, capable of communicating with the terminal (1) and means (2,5) to transmit time stamps, using a modulated signal having a carrier frequency, to the terminal (1). The authorisation device (6) comprises means (8) for selecting a carrier frequency to tune in to for retrieving a time stamp. A terminal (1) and authorisation device (6) are provided for use in the system. A computer program is suitable for loading into a programmable device, e.g. a smart card, to use it as an authorisation device (6) for use in such a system.

10 Claims, 3 Drawing Sheets

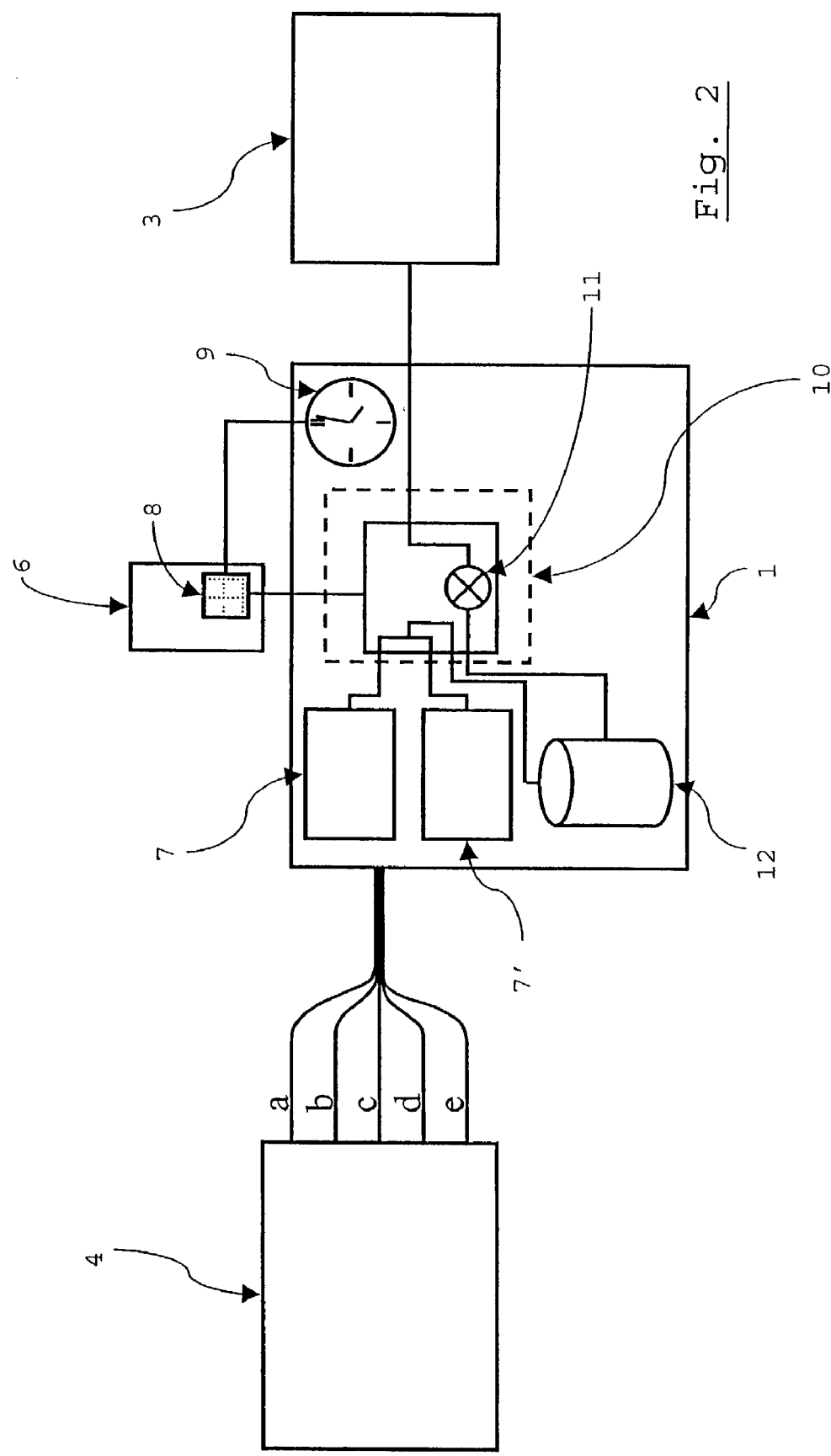

TIME VALIDATION SYSTEM

The present patent application claims the priority benefit of the filing date of European Application (EPO) No. 01202864.3 filed Jul. 26, 2001.

BACKGROUND OF THE INVENTION

The invention relates to a system for time validation, comprising a terminal with means for tuning in to a number of different carrier frequencies, an authorisation device, e.g. a smart card, capable of communicating with the terminal and means to transmit time stamps, using a modulated signal having a carrier frequency, to the terminal. The invention also relates to a terminal and to an authorisation device in such a system. The invention further relates to a computer program for loading onto a programmable device e.g. a smart card, in order to use it as an authorisation device in such a system.

When a user of the terminal in such a system is only privileged to make use of it at certain times, a representation of the current time in the terminal must be validated to check whether the current time is such a certain time. Some systems keep time using only the time stamps. Others can comprise a clock in the terminal in order to keep the time. The time according to clock and time stamps can be validated by checking the two values against each other.

Existing systems for time validation are, however, generally not reliable. In order to keep the complexity and costs of such systems down, only the authorisation device is usually made secure against tampering. Terminals are usually of a standard type, not made to withstand hacking. A clock in the terminal could be set to a different time or perhaps slowed down or speeded up. Time stamps transmitted to the terminal can be recorded and played back later in a 'spoofing' attack.

SUMMARY OF THE INVENTION

According to one aspect on the present invention there is provided a system for time validation. The system includes a terminal with a tuner to tune in to a number of different carrier frequencies, an authorisation device capable of communicating with the terminal, and a transmitter to transmit time stamps, using a modulated signal having a carrier frequency, to the terminal. The authorisation device includes a selector to select a carrier frequency to tune in to for retrieving a time stamp.

BRIEF DESCRIPTION OF THE DRAWINGS

The invention will now be described in further detail with reference to the enclosed drawings of which

FIG. 2 shows a schematic diagram of an embodiment of a system according to the present invention.

FIG. 3 exemplifies a time stamp.

DETAILED DESCRIPTION OF THE PREFERRED EMBODIMENTS

Figure 1:
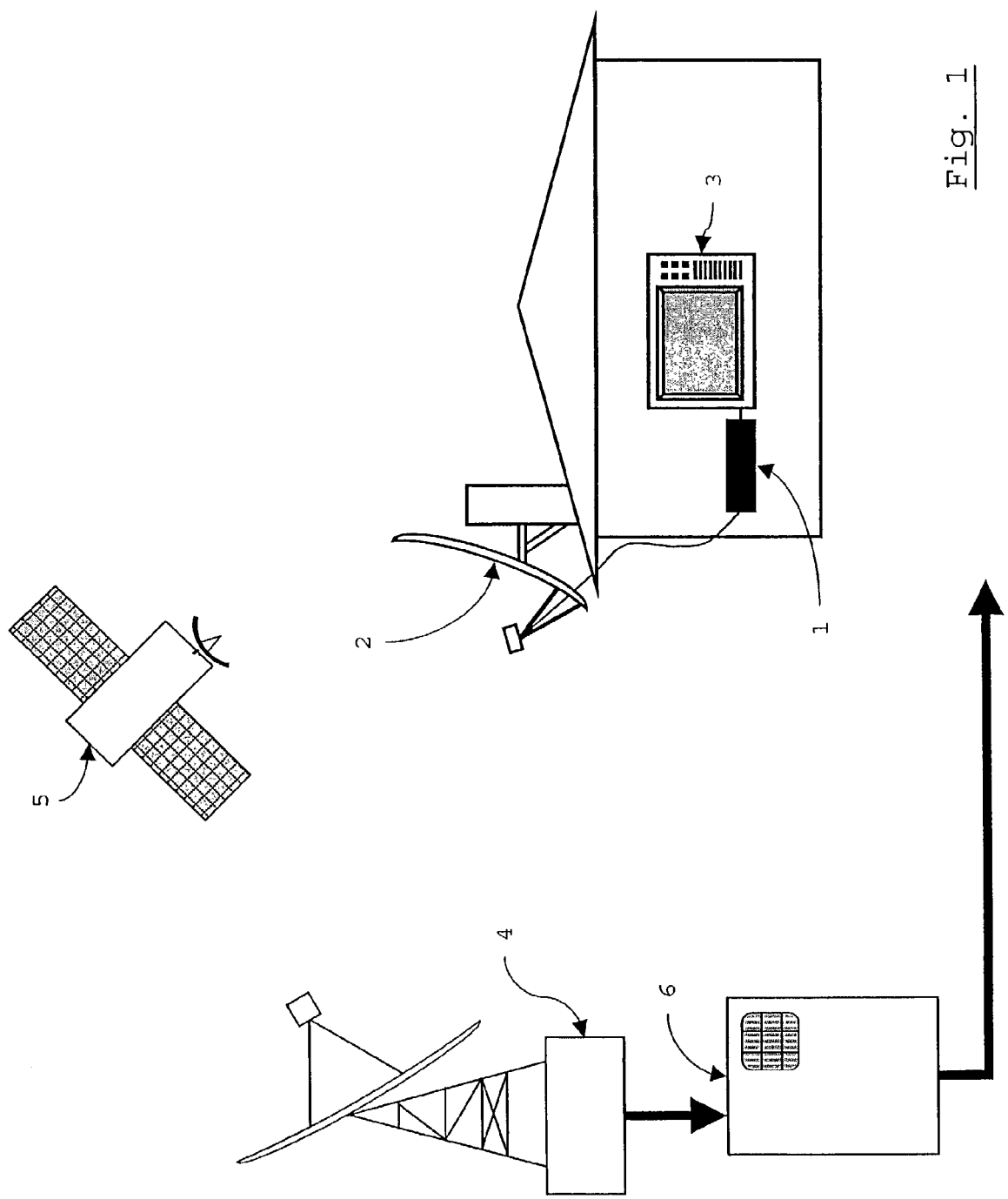
FIG. 1 shows a schematic example of a pay-TV system with features of a system according to the present invention.

A pay-TV system, such as that of FIG. 1, is a typical example of a system in which reliable time validation is required. Each subscriber has a terminal 1 for receiving signals broadcast to it. The terminal 1 can be generic, i.e. suited for use in a number of different pay-TV systems. An owner of a terminal 1 can change his subscription or subscribe to several services without changing the terminal 1. In this case, some means for allowing use of the terminal 1 in the pay-TV system subscribed to are provided to the owner by the broadcasting organisation, for instance a code or a smart card for insertion into the terminal 1. The terminal 1 could also be specific to the broadcaster. In this case, it generally comes as part of the subscription. It could still be necessary to use a smart card with the terminal 1, depending on the particular pay-TV system used by the broadcaster.

The terminal 1 in FIG. 1 is connected to a satellite dish 2. The terminal 1 is used to tune in to a carrier frequency and make information transmitted at this frequency available to a TV 3. The information is broadcast to the receiver from a broadcast station 4, via a satellite 6. The broadcast station 4 broadcasts information at a number of different carrier frequencies. The broadcast station 4 can broadcast information to the terminal 1, in digital or analogue form. The signal may be compressed or encrypted, to prevent its contents becoming accessible to non-subscribers.

Although FIG. 1 shows a pay-TV system making use of satellite communication, the invention is not restricted to broadcasts via satellite. Other pay-TV systems use networks of fibre-optic or electrically conducting cables. Pay-TV systems with terrestrial broadcasts, using antennae for transmitting and picking up the signal, can also make use of the invention. Additionally, a recorded signal, e.g. from a video or DVD, can be played to the tuner. In this case, the video signal is used by the playback device, for instance the video recorder, which can then be regarded as the broadcast station 4, to generate a modulated signal having a carrier frequency. In each case, the terminal 1 comprises, or is attached to, the appropriate means for tuning to the carrier frequency and retrieving transmitted information.

To prevent someone with a terminal 1 but no subscription from receiving the information, the broadcaster issues authorisation devices 6, like the smart card in FIG. 1. A device similar to a smart card, for instance a transponder key, could also be used. As mentioned above, the information transmitted to the terminal 1 can be encrypted or compressed before transmission. The authorisation device 6 can then contain a key for enabling decompression or decryption by the terminal 1. A combination of encryption, compression and scrambling could also be envisaged, in which case the authorisation device 6 and terminal 1 must perform a number of processes to make the broadcast information available to the user.

To explain in more detail the various components of the system, reference is made to FIG. 2. Here, the terminal 1 comprises means 7, 7' for tuning to a carrier frequency. In the shown embodiment, the terminal 1 can tune in to two different frequencies at any one time. This is symbolised by the two means 7,7', although they could be sub-circuits in one single tuning circuit. The broadcast station 4 broadcasts information to the terminal 1 at one or more carrier frequencies a-e. Again, how the transmission is achieved is immaterial, as long as the signals are used to generate modulated signals with defined carrier frequencies.

Time stamps are transmitted with the information in which the user is interested. Thus, the information is linked to the time at which it was made available to the user of the terminal 1. Restriction of access to the information to a certain period of time is thereby made possible. In addition, recording and playback of the signal at a later time is prevented. The terminal 1 must retrieve the time stamps, which are also comprised in one or more modulated signals characterised by one of a number of available carrier frequencies a-e. Time-related access control is provided by the fact that only an authorised terminal 1 can tune in to the correct carrier frequency at the correct moment for retrieving a time stamp, as will be described hereinafter.

Since the terminal 1 in the example of FIG. 2 can simultaneously tune to two different carrier frequencies, it is advantageous to distribute time stamps using at least three different carrier frequencies. If time stamps are not simultaneously transmitted on all carrier frequencies, but transmitted using differing carrier frequencies, repeated switches between carrier frequencies a-e by the terminal tuning means 7,7' will be necessary.

The authorisation device 6, connected to the terminal 1, comprises a micro-controller 8 with associated memory, which selects the frequency to tune in to for retrieving a time stamp. The authorisation device 6 is provided with rules for selecting a frequency. These rules are kept secret. It is also possible to provide the device 6 with a random number generator, making it theoretically impossible to guess which of the carrier frequencies a-e will be chosen next.

The terminal 1, or maybe the authorisation device 6, comprises a real-time clock 9. This clock 9 keeps time using the same format and reference time as the broadcaster uses for the time stamps. The first retrieved time stamp is used to start the clock 9 with the correct time. The purpose of the real-time clock 9 is to be able to allow the user of the terminal 1 access at certain times or during a certain interval of time. This depends on the conditions of the subscription, as set by the broadcaster. The time according to the real-time clock 9 is checked against the time at which access is allowed. In this way, someone who has paid to watch a TV-programme only once, cannot record the signal to play it back at a later time.

To make sure the real-time clock 9 is not tampered with after it has been set, it is advantageous to regularly check it. This can easily be done using further retrieved time stamps. The time according to these time stamps is then compared with that according to the real-time clock 9. If the difference in time falls outside a certain time window, the terminal 1 is disabled. The time window allows for inaccuracies in the comparison and any inevitable time lags due to signal processing and transmission. Validation of the time according to the real-time clock 9 ensures that a viewer cannot set the clock 9 back to watch a recorded signal a second time.

In the usual case when the user wants access to information comprised in one or more of the modulated signals having a carrier frequency, the terminal 1 comprises means 10 for allowing use of the terminal, which selectively make the information available to an authorised user. These means 10 will, as a rule, be in the form of a micro-controller with associated memory.

Selective access to the information can be afforded by these means 10 in a variety of ways, depending on the particular system. In a simple embodiment, the terminal is completely shut down when the user has no authorisation and powered up, if the user is authorised. Alternatively, access to certain channels can be blocked or released depending on the results of the user authorisation process. As another alternative, the information from the broadcast station 4 can be encrypted, encoded, or scrambled. The means 10 for allowing use of the terminal then comprise modules for decrypting, decoding or descrambling the information when it has been determined that the user is authorised to access the information.

In the example of FIG. 2, the means 10 for allowing use of the terminal comprise a decryptor 11, using a key stored in the authorisation device 6. If the authorisation device 6 determines that use of the terminal 1 should be disabled, decryption stops. This can occur when the time interval allowed for use has elapsed, or when the system has been tampered with.

It is advantageous to change the key for decrypting the information often. This can be done by sending new keys in encrypted form. Means for decrypting keys are provided by entitlement management messages, provided to the user at longer intervals. An entitlement management message can be valid for a certain period of time. Accordingly, it is advantageous to time stamp entitlement management messages, to ensure that they are only usable during a certain period, just as information is time-stamped to ensure that it is only accessible during a certain period. An embodiment of the present invention can easily comprise this feature, for example by adding the entitlement management message to the time stamp, or sending the message with the time-stamped broadcast information.

The terminal 1 shown in FIG. 2 can simultaneously tune to two carrier frequencies. This can be used to advantage. One of the means 7,7' can be used to tune to the carrier frequency from which to retrieve a time stamp, whilst the other stays tuned to the carrier frequency at which the information is transmitted. This would prevent interruption in the delivery of the signal to the connected device 3 when the time stamp is not broadcast with the same carrier frequency as the information. Alternatively, or additionally, the terminal 1 can have some kind of storage means 12 for storing demodulated signals before decryption, in order to prevent disruption of viewing during the short period of time needed for retrieving a time stamp.

FIG. 3 shows an example of a time stamp with four fields. One data field contains the date 31, another contains the time 32. Of course, these two fields could be combined into one. A third data field contains the carrier identification 33, i.e. an indication of which carrier frequency is used to transmit this particular time stamp. The last field of the time stamp is an encrypted signature 34. The signature is specific for each carrier frequency. Decryption of the encrypted signature 34 gives information on one or all of the other data 31, 32, 33 in the signature. This is a protective measure against false time stamps, to further increase the reliability of the system. In cases where an entitlement message is included in the time stamp, it can be contained in a further field in the time stamp, not shown in FIG. 3.

Figure 4:
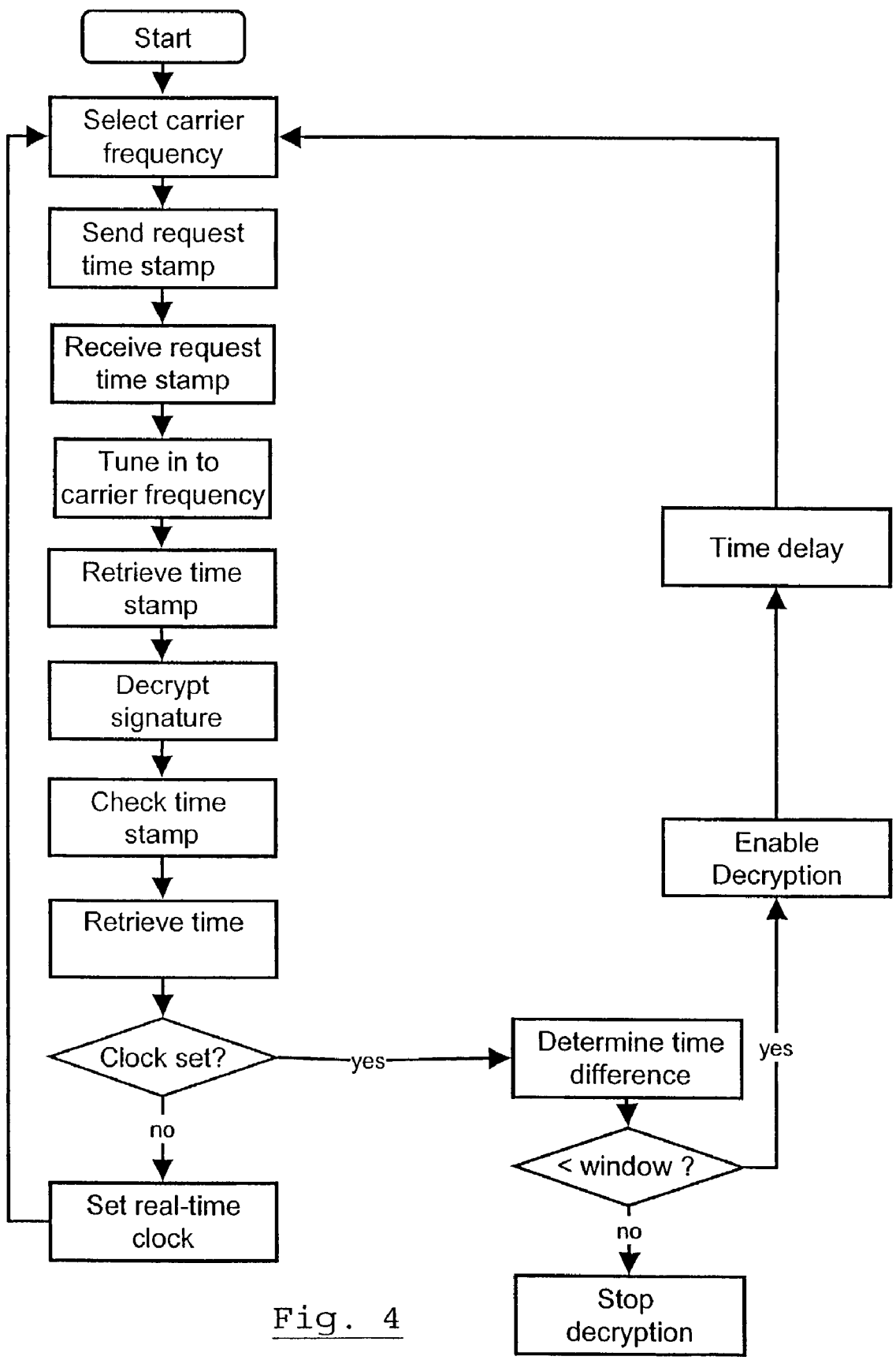
FIG. 4 shows a flow diagram of a process carried out in a system according to the present invention.

To summarise the important aspects mentioned above, FIG. 4 shows an example of a process of time validation as carried out by the system. After the terminal 1 has been switched on, the authorisation device 6 selects a carrier frequency to tune in to for retrieving a time stamp. Ideally, this is done using a random number generator. A request for a time stamp is sent to the terminal 1, along with the carrier frequency to tune in to for retrieving this time stamp. The authorisation device 6 keeps track of the requested frequency, so that it can be checked against the carrier identification 33 and encrypted signature 34 comprised in the retrieved time stamp. These should, of course correspond, when the authorisation device 6 is authentic.

The terminal 1 receives the request for a time stamp and the relevant carrier frequency to use to retrieve it. One of the tuning means 7,7' tunes in to the carrier frequency and the time stamp is retrieved. Either the time stamp is sent directly to the authorisation device 6, or the signature is first decrypted in the terminal 1, using a key supplied by the authorisation device 6. At any rate, the decrypted signature 34 proves that the time stamp has indeed been retrieved from the signal with the requested carrier frequency. The time 32 can then be retrieved from the time stamp.

If this is the first retrieved time stamp, it is used to initialise the real-time clock 9. The whole process can then be repeated to retrieve a second time stamp. Any time stamp that is not the first retrieved time stamp can be used to validate the time, i.e. check that the real-time clock 9 is still set to the correct time. The size of the difference between the time according to the real-time clock 9 and that according to the latest time stamp is determined. If this size is smaller than a certain permissible window, then the time is correct. Providing the user of the terminal 1 is authorised to receive the information at that moment in time, the received information can be decrypted in the decryptor 11, and passed on to the device, for instance the TV 3, attached to the terminal 1. After a certain time delay, the process of time validation is repeated again.

It is clear that the invention is not limited to the above-described embodiments, given by way of example. The invention can be varied within the scope of the claims. Thus, all communication methods that allow the use of modulated signals having a carrier frequency can be used in the system according to the invention. Whether and, if so, what kind of information is transmitted with the time stamps is also irrelevant.

What is claimed is:

1. A system for time validation, the system including:
    a terminal with at least one tuner to tune in to any one of a number of different carrier frequencies;
    an authorisation device capable of communicating with the terminal; and
    a transmitter to transmit time stamps, using a modulated signal having a carrier frequency, to the terminal,
    wherein the authorisation device includes a selector including a random number generator to randomly select a carrier frequency to tune in to for retrieving a time stamp.

2. The system of claim 1, wherein time stamps are transmitted at a number of different carrier frequencies, which exceeds the number of different carrier frequencies the terminal can simultaneously tune in to.

3. The system of claim 1, wherein the time stamp comprises a field identifying the carrier frequency, a field representing a date, a field representing a time, and an encrypted signature.

4. The system of claim 1, with a capability to allow use of a terminal during a specified time interval.

5. The system of claim 1, with a capability to add information to the time stamps and insert both into at least one of the modulated signals having a carrier frequency.

6. The system of claim 1, further comprising a pay-TV broadcast station, with a capability to transmit at differing carrier frequencies to the terminal.

7. The system of claim 1, including a programmable device suitable for loading into the programmable device a computer program in order to use the programmable device, when programmed, as an authorisation device in a system.

8. A system for time validation, the system including:
    a terminal with at least one tuner to tune in to any one of a number of different carrier frequencies;
    an authorisation device capable of communicating with the terminal, the authorisation device including a selector to select a carrier frequency to tune in to for retrieving a time stamp;
    a transmitter to transmit time stamps, using a modulated signal having a carrier frequency, to the terminal; and
    a real-time clock, capable of being set to a time retrieved from a time stamp;
    wherein the authorisation device includes a selector including a random number generator to randombly select a carrier frequency to tune in to for retrieving a time stamp.

9. The system of claim 8, with a capability repeatedly to retrieve further time stamps and to compare a time retrieved from at least one of the retrieved time stamps with a time according to the real-time clock.

10. The system of claim 9, with a capability to allow use of the terminal, when a result of the comparison is smaller than a specified time window.

* * * * *

UNITED STATES PATENT AND TRADEMARK OFFICE
CERTIFICATE OF CORRECTION

PATENT NO. : 7,296,162 B2  Page 1 of 1
APPLICATION NO. : 10/206245
DATED : November 13, 2007
INVENTOR(S) : Wajs It is certified that error appears in the above-identified patent and that said Letters Patent is hereby corrected as shown below:

Column 6, line 6, in Claim 4, delete "of a" and insert -- of the --, therefor.

Column 6, line 31, in Claim 8, delete "randombly" and insert -- randomly --, therefor.

Signed and Sealed this

Twenty Second Day of April, 2008

JON W. DUDAS
*Director of the United States Patent and Trademark Office*